United States Patent
Lee et al.

(10) Patent No.: US 8,025,983 B2
(45) Date of Patent: Sep. 27, 2011

(54) JOINING METHOD BETWEEN FE-BASED STEELS AND TI/TI-BASED ALLOYS HAVING JOINT STRENGTH HIGHER THAN THOSE OF BASE METALS BY USING INTERLAYERS AND THE JOINTS PRODUCED USING THE METHOD

(76) Inventors: Min Ku Lee, Daejeon (KR); Jung Gu Lee, Pohang-si (KR); Jin-Ju Park, Daejeon (KR); Chang-Kyu Rhee, Daejeon (KR)

( * ) Notice: Subject to any disclaimer, the term of this patent is extended or adjusted under 35 U.S.C. 154(b) by 298 days.

(21) Appl. No.: 12/503,934

(22) Filed: Jul. 16, 2009

(65) Prior Publication Data

US 2010/0124669 A1    May 20, 2010

(30) Foreign Application Priority Data

Nov. 20, 2008 (KR) .................. 10-2008-0115830

(51) Int. Cl.
*B23K 35/22* (2006.01)
*B32B 15/01* (2006.01)

(52) U.S. Cl. ........ 428/660; 428/685; 428/661; 428/667; 428/679; 428/662; 428/663; 228/262.72

(58) Field of Classification Search .................. None
See application file for complete search history.

(56) References Cited

U.S. PATENT DOCUMENTS

| | | | | |
|---|---|---|---|---|
| 2,908,966 A | * | 10/1959 | Wagner | 428/656 |
| 2,908,969 A | * | 10/1959 | Wagner | 228/118 |
| 4,674,675 A | * | 6/1987 | Mietrach | 228/194 |
| 4,806,438 A | * | 2/1989 | Hinotani | 428/660 |
| 4,839,242 A | * | 6/1989 | Murayama et al. | 428/660 |
| 5,060,845 A | * | 10/1991 | Suenaga et al. | 228/186 |
| 5,082,161 A | * | 1/1992 | Utida et al. | 228/262.2 |

FOREIGN PATENT DOCUMENTS

| | | | |
|---|---|---|---|
| JP | 56-1287 | * | 1/1981 |
| JP | 56-71590 | * | 6/1981 |
| JP | 60-261682 | * | 12/1985 |
| JP | 61-78585 | * | 4/1986 |
| JP | 63-130281 | * | 6/1988 |
| JP | 2-205280 | * | 8/1990 |
| JP | 1999-090650 A | | 4/1999 |
| JP | 1999-170066 A | | 6/1999 |
| JP | 2008-73738 | * | 4/2008 |
| KR | 10-2002-0042108 A | | 6/2002 |
| SU | 1155395 | * | 5/1985 |

* cited by examiner

*Primary Examiner* — John J Zimmerman
(74) *Attorney, Agent, or Firm* — Maier & Maier, PLLC

(57) ABSTRACT

A joining method between Fe-based steel and Ti/Ti-based alloys having a joint strength higher than those of base metals by using interlayers. The production of intermetallic compounds at a joint portion between Fe-based steel and Ti/Ti-based alloys can be prevented using interlayers, and strong interface diffusion bonding can be formed at interfaces between interlayers, thereby producing a high-strength joint. Accordingly, the present disclosure can be used to develop high-strength, high-functional advanced composite materials.

10 Claims, 3 Drawing Sheets

JOINING METHOD BETWEEN FE-BASED STEELS AND TI/TI-BASED ALLOYS HAVING JOINT STRENGTH HIGHER THAN THOSE OF BASE METALS BY USING INTERLAYERS AND THE JOINTS PRODUCED USING THE METHOD

CROSS-REFERENCES TO RELATED APPLICATION

This patent application claims the benefit of priority under 35 U.S.C. §119 of Korean Patent Application No. 10-2008-0115830 filed on Nov. 20, 2008, the contents of which are incorporated herein by reference.

BACKGROUND OF THE INVENTION

1. Field of the Invention

The present invention relates to a joining method between Fe-based steels and Ti/Ti-based alloys having a joint strength higher than those of base metals by using interlayers.

2. Description of the Related Art

Many components that require joints between metals or alloys exist in most structures, i.e., transport machinery such as buildings, automobiles, ships, airplanes and trains, various types of tubes and pipes, and the like. A high-temperature fusion welding process using arc welding techniques is used in these joints between metals or alloys. However, since such a fusion joining (or welding) process is performed at a high temperature, the structure of a base metal is changed due to the coarsening of grains, the formation of a heat affected zone (HAZ), and the like. Therefore, mechanical properties of the base metal may be degraded. Further, material defects such as stress corrosion cracking may occur due to the formation of internal stresses caused by high-temperature treatment. To solve these problems, studies have been actively conducted to develop low-temperature solid-state joining techniques using a non-melting process, which have sufficient joining strengths between metals or alloys of such components and excellent leak-tight characteristics.

As one of these solid-state joining techniques, a brazing technique is applied to joints between dissimilar metals, ceramics, high-temperature special materials and the like, which are impossible using conventional fusion joining techniques. As compared with the fusion joining techniques, the brazing technique has no deformation of base metals and obtains very preferable effects in terms of thermal stresses at joint portions while having no influence on mechanical properties of the base metals. Therefore, studies have been conducted to apply the brazing technique to various types of components used in high-tech industrial facilities.

Particularly, titanium is a high value-added metal having corrosion resistance, thermal resistance, high specific strength and the like. If it is possible to obtain dissimilar joints or combinations between titanium and Fe-based steel alloys that are conventional structure materials, highly functional advanced composite material techniques can be secured, and technological spillovers and market creation are highly probable. For this reason, interests in the dissimilar joints between titanium and Fe-based steel alloys are increased.

However, when dissimilar metals (or alloys) are joined through a brazing process, in most cases, very brittle intermetallic compounds are formed at a joint portion between two base metals due to the reaction between elements of the base metals or between elements of a base metal and an filler alloy, and therefore, the toughness of the joint portion may be reduced. Specifically, a large amount of elements of two base metals or alloys are dissolved into a filler melted through the brazing process, and brittle intermetallic compounds are produced due to the reaction among elements of the filler alloy and base metal. For example, brittle intermetallic compounds of Ti—Cu, Ti—Fe and the like are formed at a joint portion in case of an Ag—Cu based alloy that is widely utilized as a filler for titanium brazing, and brittle intermetallic compounds of Ti—Fe—Ni, Ti—Cu—Fe, Ti—Zr—Fe—Ni and the like are formed at the joint portion when Ti-based amorphous alloys such as Ti—Zr—Ni and Ti—Zr—Cu—Ni are used. Therefore, the toughness of the joint portion is reduced, and the strength of the joint portion is decreased. Such a phenomenon shows that it is difficult to solve fundamental brittleness problems of dissimilar joints between Ti/Ti-based and Fe-based steel alloys by using a single brazing filler alloy.

Korean Patent Laid-Open Publication No. 2002-0042108 has disclosed a method of joining a carbon steel and a corrosion resistance material (nickel, titanium or the like) as dissimilar metals through resistance seam welding by independently using a sheet-metal strip of an amorphous alloy containing Fe as a first binder or by additionally using a sheet-metal strip of an alloy containing nickel or stainless steel and copper as a second binder in order to join.

Japanese Patent Laid-Open Publication No. 1999-900650 has disclosed a method of solid-state joining a titanium alloy and alloyed steel as dissimilar metal materials by independently using one of tantalum, molybdenum, vanadium, niobium, zirconium, hafnium, titanium, nickel and palladium as an intermediate material between the dissimilar metal materials. Further, Japanese Patent Laid-Open Publication No. 1999-170066 has disclosed a method of pressure joining a titanium alloy and a dissimilar metal material such as steel under vacuum by using one or more of tantalum, molybdenum, tungsten, niobium and vanadium as an intermediate material.

In these inventions, only materials available as intermediate or filler alloys are independently used or selectively combined. However, these inventions do not control weak and brittle intermetallic compounds formed at joint portions or solve fundamental brittleness problems at joint portions. Therefore, high-strength joint portions are not obtained.

As described above, the conventional methods do not solve fundamental brittlenesses of joint portions in joints between Fe-based steels and Ti/Ti-based alloys. Therefore, efforts are still made to solve fundamental brittleness problem.

Accordingly, the present inventors have made efforts to prevent weakness at a dissimilar metal joint portion and improve a joint strength when Fe-based steels and Ti/Ti-based alloys are joined using the brazing technique. As a result, the present inventors have found that Fe-based steels and Ti/Ti-based alloys are joined by adopting an interlayer formed of a consecutively triple-layered structure as a new interlayer component except conventional insertion members between Fe-based steel and Ti/Ti-based alloy base metals, so that it is possible not only to prevent brittle intermetallic compounds from being formed between two metal or alloy base metals, but also to obtain superior joint portions between dissimilar metals having a joint strength higher than those of the base metals. Here, the consecutive triple layer comprises a nickel layer as a first interlayer, a chrome layer as a second interlayer, and vanadium, molybdenum or tungsten layer as a third interlayer. Based on these findings, the present invention was completed.

SUMMARY OF THE INVENTION

The present invention is conceived to solve the aforementioned problems. Accordingly, it is an object of the present invention to provide a joining method between Fe-based steel and Ti/Ti-based alloys, which can prevent brittle intermetallic compounds from being formed at a joint portion between the dissimilar metals and improve the joint strength of the joint portion.

It is another object of the present invention to provide a joint produced using the joining method.

To achieve these objects of the present invention, the present invention provides a joining method comprising the step of joining Fe-based steel and Ti/Ti-based alloys by inserting interlayers and a titanium- or zirconium-based filler alloy between Fe-based steel and Ti/Ti-based alloy base metals, and then heating the base metals at a temperature higher than the melting point of the filler alloy and lower than those of the base metals, the interlayers being laminated in the order of a nickel layer as a first interlayer, a chrome layer as a second interlayer, and a vanadium, molybdenum or tungsten layer as a third interlayer on top of the Fe-based steel alloy base metal, and the filler alloy being inserted between the vanadium, molybdenum or tungsten layer and the Ti/Ti-based alloy base metal, and a joint produced using the method.

BRIEF DESCRIPTION OF THE MARK OF DRAWINGS

Figure 1:
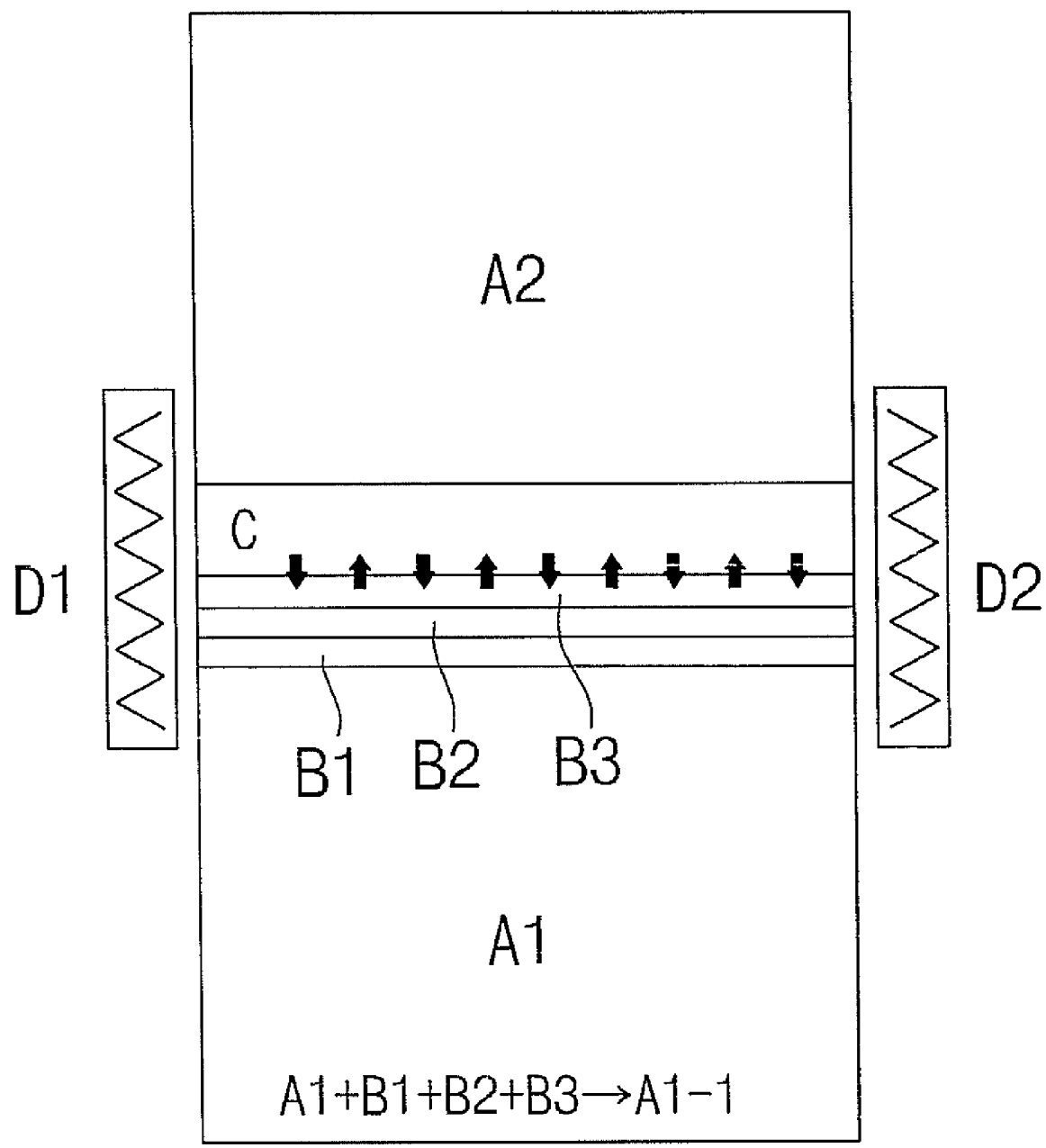
FIG. 1 is a schematic view illustrating a joining method between Fe-based steels and Ti/Ti-based alloys having a joint strength higher than those of base metals by using interlayers according to the present invention.

A1: Fe-based alloy base
A1-1: Fe-based alloy base formed with interlayers
A2: Ti/Ti-based alloy base
B1: The first interlayer (Ni layer)
B2: The second interlayer (Cr layer)
B3: The third interlayer (V, Mo or W layer)
C: Ti-based or Zr-based filler alloy
D1: The first heater
D2: The second heater

DESCRIPTION OF THE PREFERRED EMBODIMENTS

Hereinafter, exemplary embodiments of the present invention will be described in detail.

The present invention provides a joining method between Fe-based steel and Ti/Ti-based alloys having a joint strength higher than those of base metals by using interlayers.

The joining method according to the present invention comprises the step of joining Fe-based steel and Ti/Ti-based alloys by inserting interlayers and a titanium- or zirconium-based filler alloy between Fe-based steel and Ti/Ti-based alloy base metals and then heating the base metals at a temperature higher than the melting point of the filler alloy and lower than those of the base metals, the interlayers being laminated in the order of a nickel layer as a first interlayer, a chrome layer as a second interlayer, and a vanadium, molybdenum or tungsten layer as a third interlayer from the Fe-based steel alloy base metal, and the filler alloy being inserted between the vanadium, molybdenum or tungsten layer and the Ti/Ti-based alloy base metal.

If the Fe-based steel and Ti/Ti-based alloy base metals having the interlayers inserted therebetween are heated at a temperature higher than the melting point of the titanium- or zirconium-based filler alloy, a high-strength joint between the Fe-based steel and Ti/Ti-based alloy base metals is formed by an isothermal solidification and a subsequent inter-atomic diffusion reactions among the molten titanium- or zirconium-based filler alloy, the vanadium, molybdenum or tungsten layer as the third interlayer, and the Ti/Ti-based alloy base metal, and by solid-state diffusion reactions at an interface between the nickel layer as the first interlayer and the Fe-based steel alloy base metal, an interface between the nickel layer as the first interlayer and the chrome layer as the second interlayer, and an interface between the chrome layer as the second interlayer and the vanadium, molybdenum or tungsten layer as the third interlayer.

In the joining method according to the present invention, the interlayers prevents the Fe-based steel ally base metal from being dissolved into the titanium- or zirconium-based filler alloys by controlling diffusion of the Fe-based steel ally base metal, so that production of intermetallic compounds between the Fe-based steel and Ti/Ti-based alloy base metals is completely prevented. In this case, the interlayers may be laminated in the order of a nickel layer (first interlayer), a chrome layer (second interlayer) and a vanadium, molybdenum or tungsten layer (third interlayer) on top of the Fe-based steel ally base metal. However, the present invention is not limited thereto.

The interlayers may be formed using lamination methods generally used in the art. Preferably, the interlayers are formed using methods including plating, coating, deposition, cladding, foiling and the like.

In the joining method according to the present invention, any one capable of performing a strong joint through a solid-state diffusion reaction caused by the difference of compositions between the vanadium, molybdenum or tungsten layer and Ti/Ti-based alloy base metal may be unlimitedly used as the titanium- or zirconium-based filler alloys. Preferably, the titanium-based filler alloys include Ti—Cu—Ni, Ti—Zr—Ni, Ti—Zr—Cu, Ti—Zr—Cu—Ni, Ti—Zr—Cu—Ni—Be and the like, and the zirconium-base filler alloys include Zr—Ti—Ni, Zr—Ti—Cu, Zr—Ti—Cu—Ni, Zr—Ti—Cu—Ni—Be and the like. However, the present invention is not limited thereto.

Any shape capable of being uniformly inserted between the Fe-based steels and Ti/Ti-based alloy base metals may be unlimitedly used as the shape of the titanium- or zirconium-based filler alloy. Preferably, the shape of the titanium- or zirconium-based filler alloy is formed in the shape of powder, ribbon, thin films, plate or the like.

In the joining method according to the present invention, the base metals are preferably heated at a temperature higher than the melting point of the filler alloy and lower than the melting point of one base metal of the two base metals, having a relatively lower melting point than that of the other of the two base metals. More preferably, the heating temperature is in a range of 730 to 1400° C.

Hereinafter, the present invention will be described in more detail with reference to FIG. 1 which is a schematic view illustrating the joining method according to the present invention.

Referring to FIG. 1, in the joining method according to the present invention, a nickel layer B1 as a first interlayer, a chrome layer B2 as a second interlayer, and a vanadium, molybdenum or tungsten layer B3 as a third interlayer are sequentially formed on a base metal A1 (Fe-based steel alloy base metal) to be joined. A titanium- or zirconium-based filler alloy C is interposed between a Fe-based steel alloy base metal A-1 and a dissimilar base metal A2 (Ti/Ti-based alloy base metal). Here, the Fe-based steel alloy base metal A-1 has a triple layer comprising the nickel layer B1, the chrome layer B2, and the vanadium, molybdenum or tungsten layer B3 as interlayers, formed on the Fe-based steel alloy base metal A1.

Subsequently, the Fe-based steel alloy base metal A-1 having the interlayers and the Ti/Ti-based alloy base metal A2, having the titanium- or zirconium-based filler alloy C interposed therebetween, is heated at a temperature higher than the melting point of the titanium- or zirconium-based filler alloy C by operating first and second heaters D1 and D2. If the heating state is maintained for a fixed time, alloy elements are diffused due to the difference of compositions between the melted titanium- or zirconium-based filler alloy C and the vanadium, molybdenum or tungsten layer B3 of the Fe-based steel alloy base metal A-1, and between the melted titanium- or zirconium-based filler alloy C and the Ti/Ti-based alloy base metal A2. As a result, strong joints are formed between the titanium- or zirconium-based filler alloy C and the Fe-based steel alloy base metal A-1 having the interlayers and between the titanium- or zirconium-based filler alloy C and the Ti/Ti-based alloy base metal A2. In the same manner, solid-state diffusion reactions are also generated between the Fe-based steel alloy base metal A1 and the nickel layer B1, thereby forming the strong joint. Further, the strong joints due to the solid-state diffusion reactions are formed at interfaces among the nickel layer B1, the chrome layer B2, and the vanadium, molybdenum or tungsten layer B3. These interfaces are alloy designed to have metals having large or perfect solid solubility, so that any brittle phases are not formed between two metals reacted to each other at the interface therebetween.

Consequently, in the joining method according to the present invention, the interlayers B1, B2 and B3 serve as effective diffusion control layers, thereby preventing the Fe-based steel alloy base metal A1 from being dissolved into the melted titanium- or zirconium-based filler alloy C. Accordingly, it is possible to prevent intermetallic compounds from being produced between titanium and Fe-based steel, otherwise it generally results in a weak and poor joint characteristic.

The present invention provides a joint produced by the aforementioned joining method, wherein production of intermetallic compounds between Fe-based steel and Ti/Ti-based alloy base metals is prevented by inserting interlayers and a titanium- or zirconium-based filler alloy between the Fe-based steel and Ti/Ti-based alloy base metals. Here, the interlayers are laminated in the order of a nickel layer as a first interlayer, a chrome layer as a second interlayer, and a vanadium, molybdenum or tungsten layer as a third interlayer from the Fe-based steel alloy base metal. The filler alloy is inserted between the vanadium, molybdenum or tungsten layer and the Ti/Ti-based alloy base metal.

The strength at the joint portion of the joined sample according to the present invention is higher than that of the Ti base metal. Referring to Experimental example 1 and FIG. 3, it can be seen that, when a tensile test is performed with respect to the joint portion of the joined sample according to the present invention to exceed the tensile strength of the Ti/Ti-based alloy base metal, fracturing does not occur at the joint portion but occurs in the titanium-based alloy base metal. Accordingly, it can be seen that the joined sample produced by inserting interlayers between the base metals has a joint strength higher than that of the Ti base metal.

Hereinafter, the present invention will be described in more detail with reference to the following Examples and Comparative examples. However, it will be appreciated that those skilled in the art, on consideration of this disclosure, may make modifications and improvements within the spirit and scope of the present invention.

Example 1

An interlayer was formed by sequentially coating nickel, chrome and vanadium layers on a super stainless steel. A ribbon with a thickness of 40 μm, which is consisted of 58 atom % of titanium, 16 atom % of zirconium and 26 atom % of nickel, was interposed as a titanium-based filler alloy between the vanadium interlayer and pure titanium (Gr. 2), and infrared brazing was then performed while increasing a temperature at a speed of 100° C./min until the temperature becomes 930° C. under an argon atmosphere. After maintaining the temperature at 930° C. for 10 minutes, cooling was performed at a cooling speed of average 50° C./min, thereby producing an sample having titanium and super stainless steel joined together.

Figure 2:
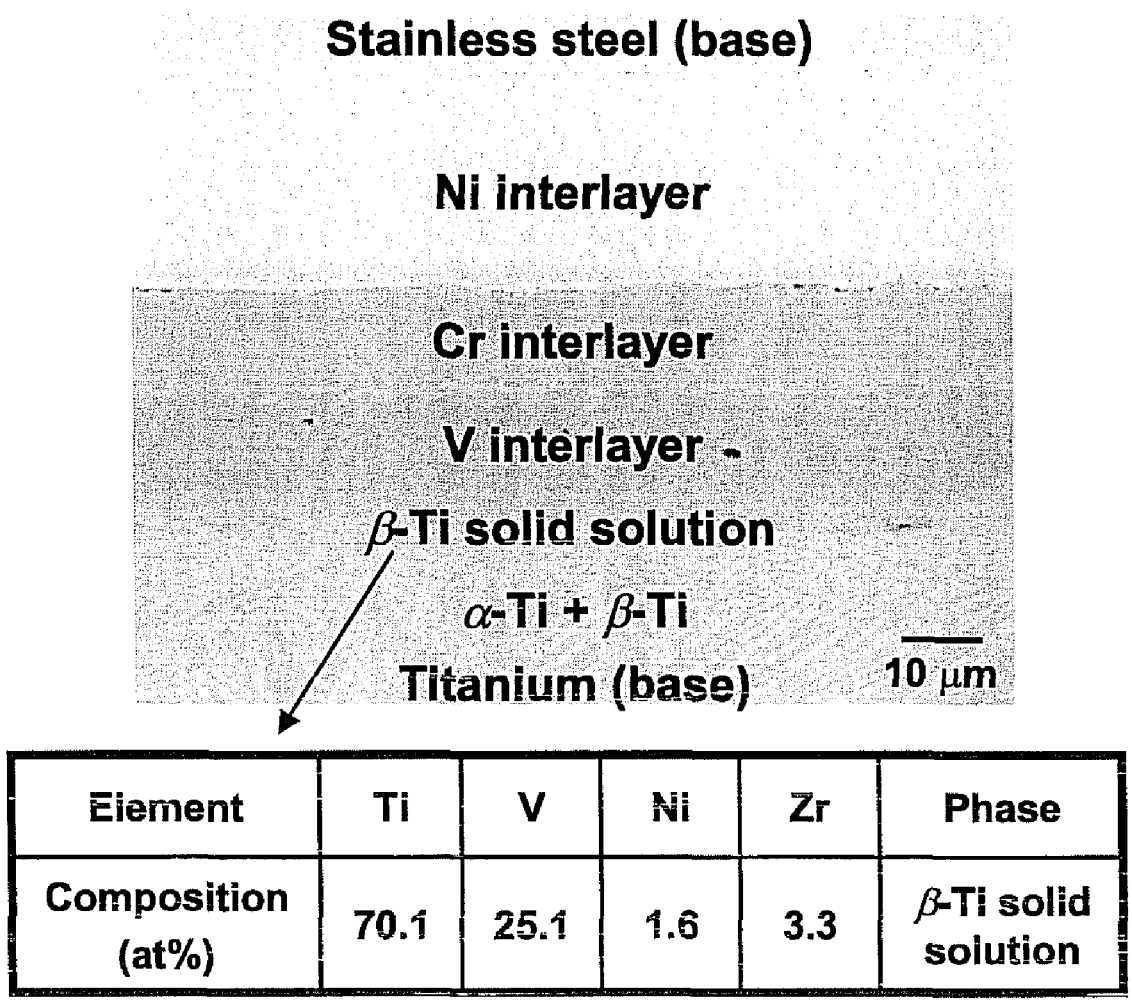
FIG. 2 shows a photograph showing a micro-structure of a joint portion between titanium and stainless steel and a composition ratio of elements in Example 1 according to the present invention.

FIG. 2 shows a photograph showing a micro-structure of a joint portion in the joined sample.

Referring to FIG. 2, a Ni—Cr—V interlayer is uniformly formed as a diffusion control layer on a super stainless steel base metal. At a joint portion between the Ni—Cr—V interlayer and the super stainless steel base metal, a Ti—V solid solution is formed near a vanadium layer through a Ti—V binary reaction, i.e., a reaction between the vanadium layer and a Ti-based amorphous filler alloy. A large amount of titanium is dissolved from a titanium base metal, and therefore, the solid solution reaction with the Ti-based amorphous filler alloy is continuously conducted. Accordingly, it can be seen that segregation layers or other brittle phases are not formed.

Example 2

A sample having titanium and super stainless steel joined together was produced using the same method as that in Example 1, except that a molybdenum layer instead of the vanadium layer is used in the interlayer.

Example 3

A sample having titanium and super stainless steel joined together was produced using the same method as that in Example 1, except that a tungsten layer instead of the vanadium layer is used in the interlayer.

Comparative Example 1

A sample having titanium and super stainless steel joined together was produced using the same method as that in Example 1, except that an interlayer is not interposed between the titanium and the super stainless steel.

Experimental Example 1

Measurement of Joint Strength

To measure the joint strengths of specimens of the joint produced in Example 1 and Comparative example 1, tensile tests (ASTM E 8/E 8M-08) are performed, and the results are shown in the following Table 1 and FIG. 3.

TABLE 1

| Specimen | Yield stress (Mpa) | Tensile stress (Mpa) | Strain (%) |
|---|---|---|---|
| Example 1 | 330 ± 5 | 450 ± 5 | 25 ± 10 |
| Comparative Example 1 | — | 80 ± 50 | — |
| Titanium base metal | 325 | 450 | 35 |

Figure 3:
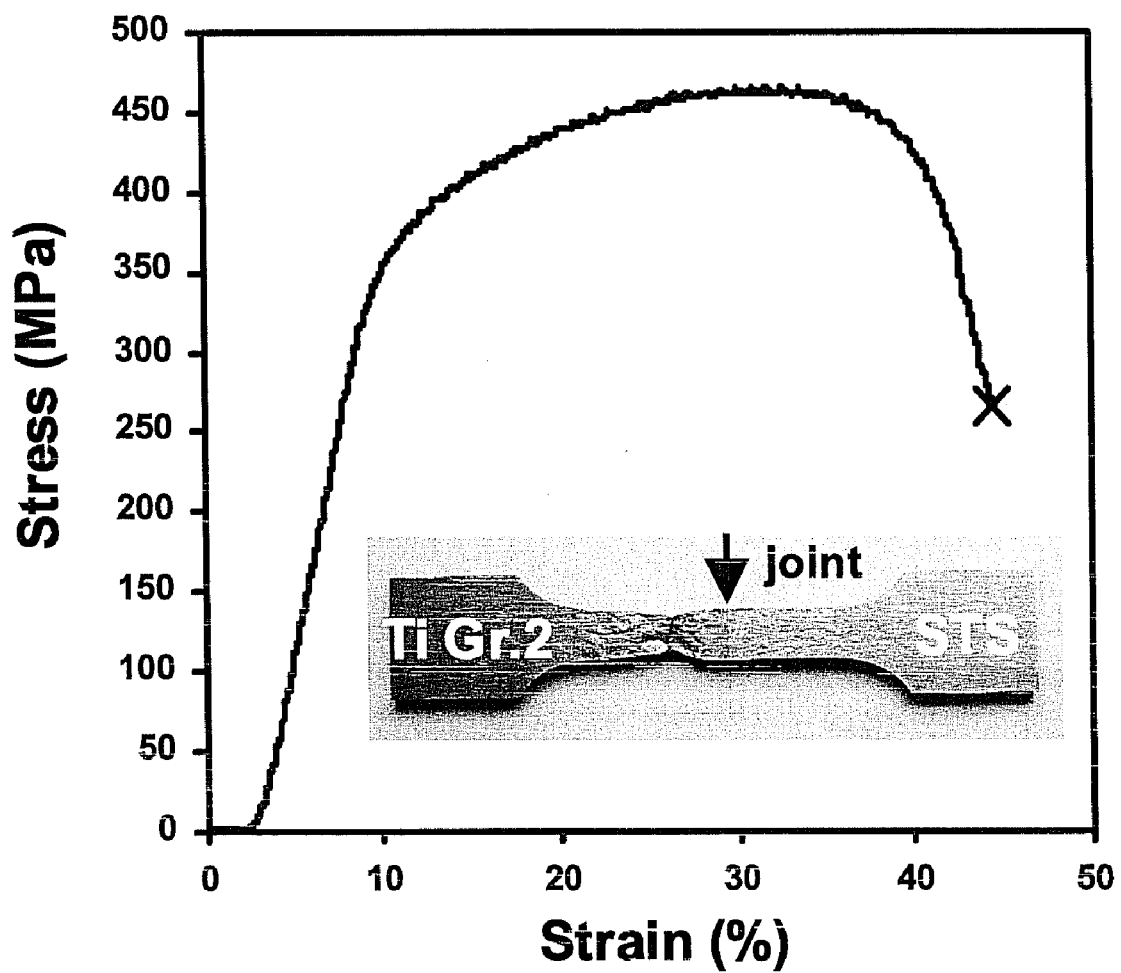
FIG. 3 is a graph showing a measurement result of joint strengths at a joint portion (arrow) of a titanium-stainless steel specimen in Example 1 according to the present invention.

Referring to Table 1 and FIG. 3, it can be seen that fracturing does not occur at the joint portion in the joined sample of Example 1 but occurs in the titanium base metal itself. Hence, the fracture strength is about 450 MPa, which is almost the same as the tensile strength of the titanium base metal. Therefore, it can be seen that the joint strength of the titanium-stainless steel specimen is higher than the tensile strength of the titanium base metal.

According to the present invention, production of intermetallic compounds at a joint portion between Fe-based steel and Ti/Ti-based alloys is prevented using interlayers, and strong diffusion bonding is formed at interfaces between interlayers, thereby producing a high-strength joint. Accordingly, the present invention can be used to develop high-strength, high-functional advanced composite materials.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A joining method comprising:
    joining Fe-based steel and Ti/Ti-based alloys by inserting interlayers and a titanium- or zirconium-based filler alloy between Fe-based steel and Ti/Ti-based alloy base metals; and
    heating the base metals at a temperature higher than the melting point of the filler alloy and lower than those of the base metals;
    laminating the interlayers in the order of a nickel layer as a first interlayer, a chrome layer as a second interlayer, and a vanadium, molybdenum or tungsten layer as a third interlayer from the Fe-based steel alloy base metal; and
    inserting the filler alloy between the vanadium, molybdenum or tungsten layer and the Ti/Ti-based alloy base metal.

2. The joining method as set forth in claim 1, wherein, at a temperature higher than the melting point of the titanium- or zirconium-based filler alloy, a high-strength joint between the Fe-based steel and Ti/Ti-based alloy base metals is formed by an isothermal solidification and a subsequent inter-atomic diffusion reactions among the molten titanium- or zirconium-based filler alloy, the vanadium, molybdenum or tungsten layer as the third interlayer, and the Ti/Ti-based alloy base metal, and by solid-state diffusion reactions at an interface between the nickel layer as the first interlayer and the Fe-based steel alloy base metal, an interface between the nickel layer as the first interlayer and the chrome layer as the second interlayer, and an interface between the chrome layer as the second interlayer and the vanadium, molybdenum or tungsten layer as the third interlayer.

3. The joining method as set forth in claim 1, wherein the interlayers prevents the Fe-based steel alloy base metal from being dissolved into the titanium- or zirconium-based filler alloy by controlling diffusion of the Fe-based steel ally base metal, so that production of intermetallic compounds between the Fe-based steel and Ti/Ti-based alloy base metals is prevented.

4. The joining method as set forth in claim 1, wherein the interlayers are formed using one method selected from the group consisting of plating, coating, deposition, cladding and foiling.

5. The joining method as set forth in claim 1, wherein the titanium-based filler alloy is selected from the group consisting of Ti—Cu—Ni, Ti—Zr—Ni, Ti—Zr—Cu, Ti—Zr—Cu—Ni and Ti—Zr—Cu—Ni—Be.

6. The joining method as set forth in claim 1, wherein the zirconium filler alloy is selected from the group consisting of Zr—Ti—Ni, Zr—Ti—Cu, Zr—Ti—Cu—Ni and Zr—Ti—Cu—Ni—Be.

7. The joining method as set forth in claim 1, wherein the shape of the filler alloy is one selected from the group consisting of powder, ribbon, thin plate and board.

8. The joining method as set forth in claim 1, wherein the heating temperature is about 730 to 1400° C.

9. A joined sample produced by the joining method according to the claim 1, wherein production of intermetallic compounds between Fe-based steel and Ti/Ti-based alloy base metals is prevented by inserting interlayers and a titanium- or zirconium-based filler alloy between the Fe-based steel and Ti/Ti-based alloy base metals, the interlayers being laminated in the order of a nickel layer as a first interlayer, a chrome layer as a second interlayer, and a vanadium, molybdenum or tungsten layer as a third interlayer from the Fe-based steel alloy base metal, and the filler alloy being inserted between the vanadium, molybdenum or tungsten layer and the Ti/Ti-based alloy base metal.

10. The joined sample as set forth in claim 9, wherein the strength at a joint portion is higher than those of the base metals.

* * * * *